(No Model.)
P. PROVONSHA.
DOOR SECURER.
No. 515,167. Patented Feb. 20, 1894.
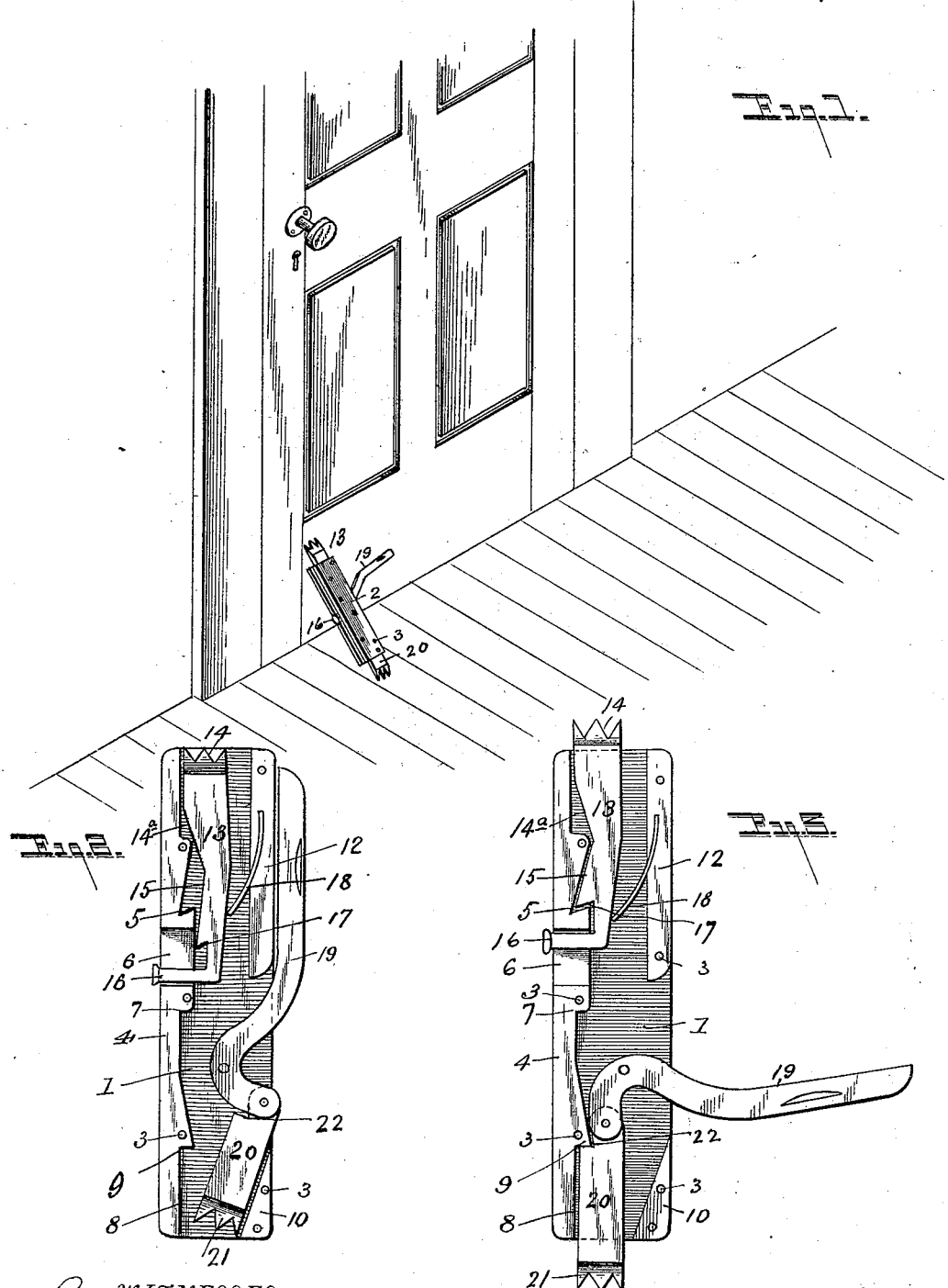
WITNESSES
INVENTOR
Peter Provonsha,
Attorneys.

UNITED STATES PATENT OFFICE.

PETER PROVONSHA, OF ALMON, WISCONSIN.

DOOR-SECURER.

SPECIFICATION forming part of Letters Patent No. 515,167, dated February 20, 1894.

Application filed October 18, 1893. Serial No. 488,463. (No model.)

*To all whom it may concern:*

Be it known that I, PETER PROVONSHA, a citizen of the United States, and a resident of Almon, in the county of Shawano and State of Wisconsin, have invented certain new and useful Improvements in Door-Securers; and I do hereby declare that the following is a full, clear, and exact description of the invention, which will enable others skilled in the art to which it appertains to make and use the same, reference being had to the accompanying drawings, which form a part of this specification.

My invention relates to improvements in door securers which can be readily carried on the person, and by means of which a door can be effectually secured against opening from the outside.

The invention consists in the novel construction and combination of parts hereinafter fully described and claimed.

In the accompanying drawings: Figure 1 is a perspective view showing the device as it appears when in use. Fig. 2 is an elevation with one of the plates of the casing removed showing the parts closed. Fig. 3 is a similar view showing them open.

In the said drawings the reference numeral 1 designates a metal plate forming one side of a casing, the other side 2 being secured thereto by means of rivets 3. Upon one edge the plate 1 is formed with a flange 4, extending from end to end, formed with a beveled recess 5, a recess 6 and a lug 7, and near the other end with a recess 8 and a shoulder 9. It is also formed or provided with a beveled lug or flange 10 at one end with a flange 12 at the opposite end.

Seated and movable in the way formed between flange 4 and flange 12 is a dog 13, having teeth or prongs 14 at its outer end, and formed with bevels 14ª and 15 near its rear or inner end. At the rear end this dog is formed with an outwardly extending arm 16, and a notch 17. This arm projects through the space formed by recess 6. A spring 18 secured to flange 12, abuts with its free end against the dog.

Pivoted to plate 1 near its center is a bent lever 19, the long arm of which projects between the plates 1 and 2. To the short arm of the lever is pivoted a dog 20 provided with teeth or prongs 21, and with a notch 22.

The operation is as follows: When not in use the dogs and levers are closed, as seen in Fig. 2. When it is desired to use the device, the arm 16 is pushed toward the end of the casing causing the dog 13 to project therethrough the notch 17 engaging with the lug 7, as seen in Fig. 2, so that said dog cannot be pushed inward until said arm is depressed to throw said lug and notch out of disengagement. The device is now set against the lower end of a door at about an angle of forty-five degrees, the teeth of the dog taking into the door and the other end of the device resting on the floor. The lever 19 is now pulled out which will force the dog 20 into the floor. The notch 22 will engage with the shoulder 9, whereby the said dog will be securely held. From the above it will be found that I provide a very efficient device for securing doors against burglars, which device may be readily carried on the person.

Having thus described my invention, what I claim is—

In a door securer, the combination with the casing, of the sliding dog having an arm projecting through the casing and formed with a notch, the pivoted lever, the dog having a notch at one end pivoted to said lever, the flanges having recesses and a shoulder and a lug for engaging with said notches in the dogs; substantially as described.

In testimony that I claim the foregoing as my own I have hereunto affixed my signature in presence of two witnesses.

PETER PROVONSHA.

Witnesses:
NELSE MADSON,
J. C. PETTY.